(12) United States Patent
Knight et al.

(10) Patent No.: US 8,541,914 B2
(45) Date of Patent: Sep. 24, 2013

(54) LIQUID COOLED ELECTRICAL MACHINE

(75) Inventors: Stephen Knight, Billericay (GB); Mike Dowsett, Basildon (GB); Toby Heason, Leicester (GB)

(73) Assignee: Controlled Power Technologies, Ltd., Laindon, Essex (GB)

( * ) Notice: Subject to any disclaimer, the term of this patent is extended or adjusted under 35 U.S.C. 154(b) by 272 days.

(21) Appl. No.: 13/063,451

(22) PCT Filed: Sep. 3, 2009

(86) PCT No.: PCT/GB2009/051114
§ 371 (c)(1),
(2), (4) Date: Mar. 25, 2011

(87) PCT Pub. No.: WO2010/029336
PCT Pub. Date: Mar. 18, 2010

(65) Prior Publication Data
US 2011/0168356 A1  Jul. 14, 2011

(30) Foreign Application Priority Data
Sep. 12, 2008  (GB) .................................. 0816711.6

(51) Int. Cl.
*H02K 9/00*  (2006.01)

(52) U.S. Cl.
USPC ................................................ 310/52; 310/59

(58) Field of Classification Search
USPC ....................................................... 310/52–59
See application file for complete search history.

(56) References Cited

U.S. PATENT DOCUMENTS

| 4,660,630 | A  | * | 4/1987 | Cunningham et al. ........ 165/133 |
| 5,056,586 | A  | * | 10/1991 | Bemisderfer .............. 165/109.1 |
| 7,102,260 | B2 | * | 9/2006 | Takenaka et al. .............. 310/64 |
| 7,117,928 | B2 | * | 10/2006 | Chen ........................... 165/80.3 |
| 7,728,467 | B2 | * | 6/2010 | Aoki et al. ....................... 310/54 |
| 2005/0253465 | A1 | * | 11/2005 | Takenaka et al. ............... 310/52 |
| 2007/0163749 | A1 | * | 7/2007 | Miyahara ..................... 165/80.3 |
| 2008/0179972 | A1 |  | 7/2008 | Aoki et al. |

* cited by examiner

*Primary Examiner* — Thanh Lam
(74) *Attorney, Agent, or Firm* — Stetina Brunda Garred & Brucker

(57) ABSTRACT

Flow control apparatus for an electrical machine and comprising an arrangement of shaped chambers and passages for conveying a liquid coolant. The rate of heat transfer from certain portions of the machine to the coolant is determined by the varying velocity of the liquid through the chambers, resulting in a generally uniform cooling of those portions of the machine.

6 Claims, 16 Drawing Sheets

LIQUID COOLED ELECTRICAL MACHINE

CROSS-REFERENCE TO RELATED APPLICATIONS

The present application claims priority to International Application No. PCT/GB2009/051114 filed on Sep. 3, 2009, which claims priority to Great Britain Patent Application No. 0816711.6 filed on Sep. 12, 2008.

STATEMENT RE: FEDERALLY SPONSORED RESEARCH/DEVELOPMENT

Not Applicable

BACKGROUND OF THE INVENTION

The present invention relates to the cooling of components in an electrical machine. In particular the invention relates to apparatus for controlling the flow of a coolant so as to provide generally even cooling of a portion of an electrical machine.

As the demand for electrical power in vehicles has increased, the trend in alternator (generator) design has been toward greater power capacity. At the same time there has been a requirement to make the alternator housing more compact, such that it takes up less space in the vehicle's engine bay. The result of these requirements has been an increased demand on the alternator's cooling system, which must remove the heat generated by the stator/rotor windings which are located in the alternator housing.

An alternator cooling system typically comprises a housing including one or more passages through which a liquid coolant flows. The coolant is usually diverted to the alternator from the vehicle's engine. U.S. Pat. No. 6,633,098 describes an arrangement for cooling the stator and rotor (including windings on the rotor) in a high-output alternator. The stator is supported by brackets which constitute a sleeve structure. Coolant passages run axially along the sleeve and circumferentially at its ends. Coolant enters at one end of the sleeve and follows a circuit which takes it to the other end and back again. It then exits the sleeve, having cooled the stator. The rotor is cooled by a centrifugal fan. Fins and guides are provided for directing the flow of air from the fan.

U.S. Pat. No. 6,046,520 is also concerned with cooling a high-output alternator. A pot-like shell (essentially a tube with a base) is attached to the alternator housing, forming a gap between the alternator housing and the shell. This gap extends circumferentially around, and axially along, the housing. Coolant enters the gap at an inlet which is tangential to the shell. It passes along the gap around the circumference of the shell and exits from an outlet about 300 degrees around from the inlet. The gap between the inlet and outlet (60 degrees apart) is partially blocked to resist the fluid taking the shorter route to the outlet. The inlet and outlet are axially displaced (staggered along the length of the shell) to enhance cooling. There is a restriction about 180 degrees around the circumference of the shell. This restriction causes some of the liquid to be diverted axially to the base area of the shell, where it can cool the bearing in that area. The rest of the liquid passes through the restriction and onto the outlet.

Thus, general arrangements of coolant passages for alternators are known. However, a growing need for the reduction of fuel consumption by the internal combustion engine has led to the development of the Integrated Starter Generator (ISG), which represents an alternative to the conventional alternator. Like an alternator, the ISG generates electric power when the engine is running, for supplying the vehicle's electrical system and charging its battery. However, the ISG combines the functions of the conventional alternator/generator with those of the starter motor in a single ISG. Thus, it is capable of switching from an alternator mode to a starter mode. The ISG can automatically stop and then rapidly restart the engine to avoid periods of unnecessary engine idling, such as when a vehicle is waiting at a traffic light. This reduces fuel consumption and exhaust emissions.

Like an alternator, the ISG includes a stator and rotor which need to be cooled. However, the dual function of the ISG described above means that it requires other components in addition to those usually found in an alternator. In particular, the ISG includes various electrical components for producing the high current needed for starting the engine. Furthermore, complex electronics are necessary to control efficiently the start-stop function of the ISG. Moreover, the ISG faces the same requirement for compactness as the conventional alternator, hence the electrical and electronic components should be integrated into the housing of the ISG in the smallest possible volume. This combination of high-power components in a small, enclosed space means that the ISG generates a large quantity of heat—significantly greater than that of a conventional alternator—which must be efficiently removed in order for the ISG to operate effectively.

BRIEF SUMMARY OF THE INVENTION

According to a first aspect of the present invention there is provided flow control apparatus for an electrical machine, the flow control apparatus comprising a first wall and a second wall, the second wall being inclined with respect to the first wall so as to define a tapered first chamber between the first and second walls, the first chamber including an entrance aperture and an exit aperture, wherein in use the taper causes the velocity of a liquid in the first chamber to be varied as the liquid is conveyed between the entrance aperture and the exit aperture, such that a transfer of thermal energy from a heat source to the liquid via the first wall is substantially uniform between the entrance aperture and the exit aperture.

Preferably the second wall of the flow control apparatus comprises a guide member, the guide member having a first face and a second face, the first face being inclined with respect to the second face so as to form a tapered profile between the first and second faces, and wherein the tapered first chamber is defined by the first wall and the first face of the guide member. The guide member may be a separable component of the machine, potentially simplifying the manufacture of the structure of the machine itself. Furthermore a range of guide members may be produced, each with a different taper angle. This enables the selection of an appropriate guide member which will provide the required flow velocity profile and cooling performance for any particular machine.

The flow control apparatus may further comprise: a third wall comprising a flow path, the flow path being arranged to receive a liquid; and a second chamber, defined by the third wall and the second face of the guide member, the exit aperture of the first chamber being coupled to the second chamber, wherein in use the liquid is conveyed from the first chamber to the second chamber via the exit aperture and at least a portion of the liquid in the second chamber is received diverted onto the flow path. Single or multiple flow paths serve to distribute the liquid to other parts of the machine for cooling those parts.

The first wall of the flow control apparatus may comprise an undulated surface suitable for inducing turbulence in the liquid. Alternatively or additionally, the first face of the guide member may comprise an undulated surface suitable for inducing turbulence in the liquid. Turbulent flow is advantageous because it can produce a higher rate of heat transfer compared to laminar flow.

According to a second aspect of the present invention there is provided a generally cylindrical housing for an electrical machine, the housing comprising: a first end comprising the flow control apparatus described above; a second end; an inner annular wall and an outer annular wall, the annular walls extending axially between the first and second ends; a plurality of passages between the inner and outer annular walls, the passages extending axially between the first and second ends; and a conduit, extending circumferentially between the inner and outer annular walls and joining the axial passages at the second end, wherein in use liquid is conveyed by the flow path of the flow control apparatus into the axial passages at the first end to the conduit at the second end, such as to transfer thermal energy from a heat source to the liquid via the inner annular wall. The features of the housing offer the combined advantages of control of flow velocity profile and distribution of liquid for cooling.

According to a third aspect of the present invention there is provided a generally ring-shaped guide member for use in a cavity of an electrical machine and suitable for influencing the flow of a liquid between an entry aperture and an exit aperture in the cavity of the machine, the guide member comprising a first face and a second face, the first face being inclined with respect to the second face so as to form a tapered profile between the first and second faces, wherein in use, a tapered first chamber is defined between a first wall of the electrical machine and the first face of the guide member, and wherein the taper of the first chamber causes the velocity of liquid adjacent to the first face to be varied as the liquid is conveyed between the entrance aperture and the exit aperture. The guide member may be a separable component of the machine, potentially simplifying the manufacture of the structure of the machine itself. Furthermore a range of guide members may be produced, each with a different taper profile. This enables the selection of an appropriate guide member which will provide the required flow velocity profile and cooling performance for any particular machine.

The first face of the guide member may comprise an undulated surface suitable for inducing turbulence in the liquid. Turbulent flow is advantageous because it can produce a higher rate of heat transfer compared to laminar flow.

According to a fourth aspect of the present invention there is provided a mating member for an electrical machine, the mating member comprising a rigid inner core surrounded by a resilient outer covering, the covering comprising: a first mating portion having a generally plain sealing surface; a second mating portion having a generally textured damping surface; and an inner annular wall and an outer annular wall, the annular walls extending between the first and second mating portions, the mating member being arranged to engage between two portions of the housing of an electrical machine such that in use the sealing surface inhibits leakage of liquid from the housing and the damping surface absorbs vibration transmitted between the portions of the housing. The dual-function mating member provides an efficient means both for sealing the liquid coolant passages and reducing vibration in the machine.

Preferably the textured damping surface comprises a plurality of raised dimples. The dimples are deformable such that they allow the two portions of the housing to be clamped securely together without causing the resilient covering to be crushed or otherwise significantly distorted in a radial direction (inwards or outwards).

According to a fifth aspect of the present invention there is provided a generally cylindrical housing for an electrical machine, the housing comprising a first portion, the first portion comprising: a first end and a second end; an inner annular wall and an outer annular wall, the annular walls extending axially between the first and second ends; a plurality of passages between the inner and outer annular walls, the passages extending axially between the first and second ends; and a conduit, extending circumferentially between the inner and outer annular walls and joining the axial passages at the second end, the housing further comprising: a second portion; and a mating member as described above, the mating member being arranged to engage between the first and second portions of the housing. The features of the housing offer the combined advantages of control of flow velocity profile and distribution of liquid for cooling; sealing; and reduction of vibration.

BRIEF DESCRIPTION OF THE DRAWINGS

Preferred embodiments of the present invention will now be more particularly described, by way of example, with reference to the accompanying drawings in which.

DETAILED DESCRIPTION OF THE INVENTION

Figure 1:
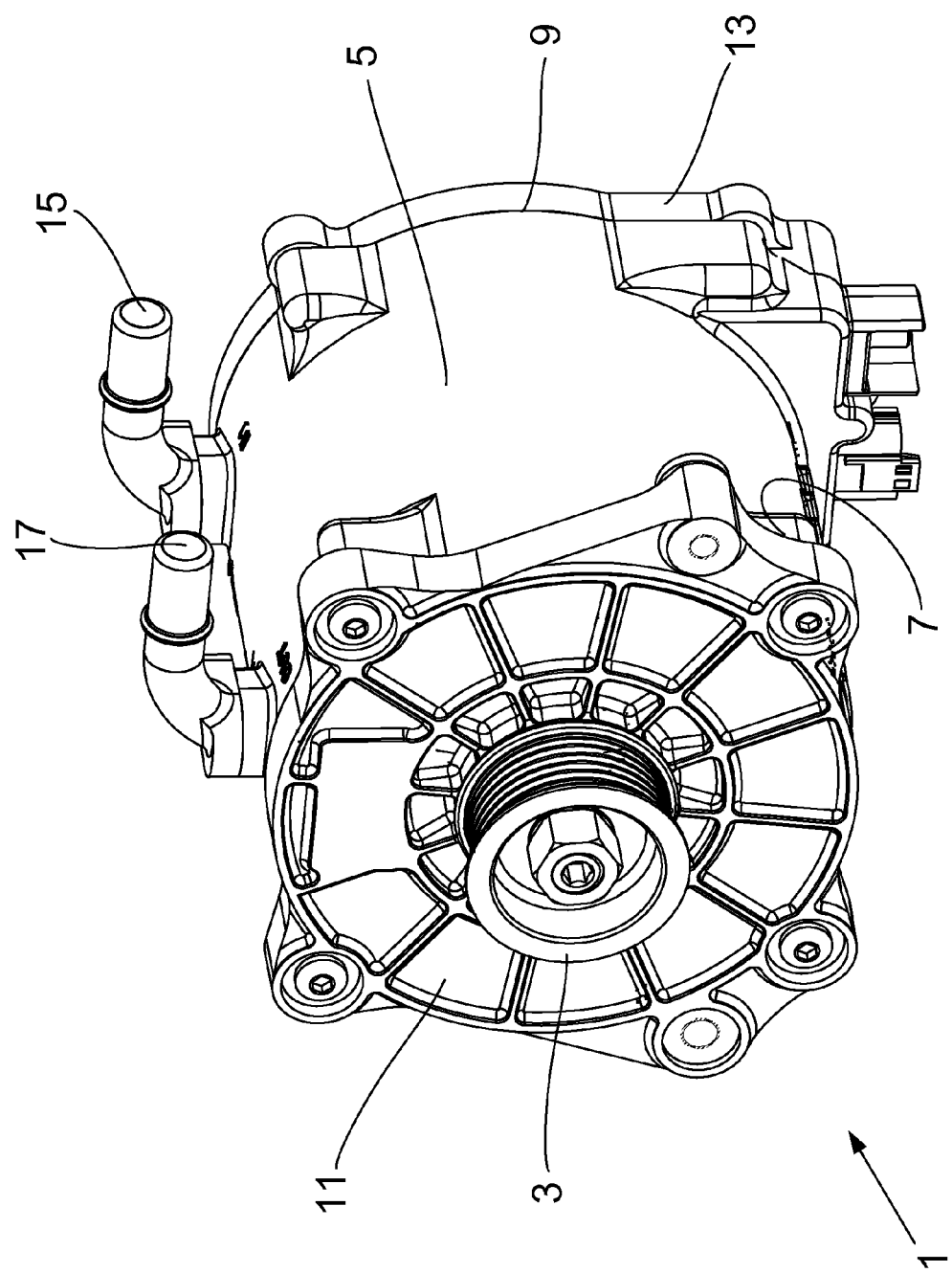
FIG. 1 shows an integrated starter generator machine (ISG) for the engine of a vehicle.

FIG. 1 shows an integrated starter generator machine (ISG) 1 for the engine of a vehicle. The ISG 1 is shown in front elevation in FIG. 2. The ISG 1 is a switched reluctance motor comprising a brushless motor with a dedicated electronic controller. It is driven by a belt (not shown) connected between the pulley 3 and the crankshaft of the engine. Torque for starting the engine is produced by the magnetic attraction of a steel rotor to stator electromagnets. No permanent magnets are needed and the rotor carries no "squirrel cage" or windings. The 12 V ISG 1 will deliver up to 65 Nm cranking torque, 2.4 kW cranking power and 3 kW generated power.

The ISG 1 comprises a generally cylindrical, die-cast aluminum housing 5 with a front face 7 and a rear face 9. The housing 5 accommodates primarily the stator assembly and associated driveshaft and bearings. An aluminum front cover 11 is removably attached to the front face 7 of the housing 5. A pod 13 containing electrical and electronic components is removably attached to the rear face of the ISG 1. The rear portion of the housing 5 projects axially inwards to form an external cavity (not shown) which receives the pod 13.

The ISG 1 includes cooling apparatus with inlet and outlet tubes 15, 17. The cooling apparatus utilises liquid coolant from the engine for cooling the electrical and electronic components and the stator assembly.

Figure 3:
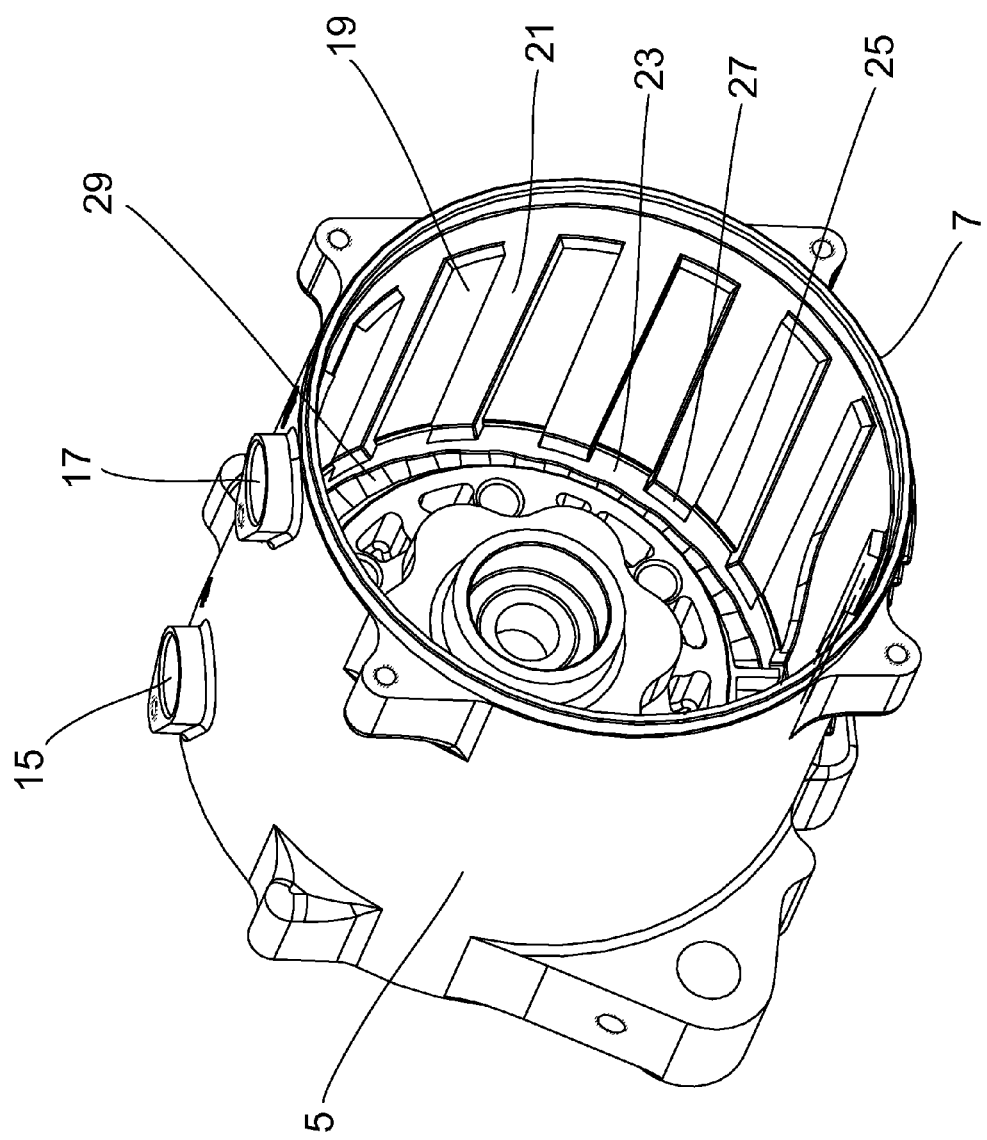
FIG. 3 shows the interior of the housing of the ISG of FIG. 1.

FIG. 3 shows the housing 5 with the front cover 11 and the pod 13 omitted. The interior of the housing 5 is cast with a total of 15 ribs 19 extending axially from their roots near the rear of the housing 5 towards the front, terminating short of the front face 7. The ribs 19 are of unequal length and are arranged such that, viewed 180 degrees around the circumference of the housing 5 from the outlet tube 17, their forward most portions extend increasingly closer towards the front face 7. The ribs 19 are circumferentially spaced such as to form between them a plurality of axial channels 21. Toward the rear of the housing 5 is a cast ridge 23 extending circumferentially around the interior of the housing 5 and joining the roots of the ribs 19 together. The ridge 23 projects inwardly to form a narrow step 25 at the root of each rib, the step 25 being normal to the face of the rib 19. The ridge 23 further forms a recessed ledge 27 in each axial channel 21 between adjacent ribs 19. The recessed ledges 27 are rearward of the steps 25, hence the alternately spaced recessed ledges 27 and steps 25 form a castellated pattern.

Toward the rear of the housing 5 and adjacent to the ridge 23 is a partition wall 29. The partition wall 29 is normal to the longitudinal axis of the housing 5 and is rearward of the recessed ledges 27 of the ridge 23. The pod 13 (not shown) containing the electrical and electronic components is on the other side (i.e. rearward) of the partition wall 29. The pod 13 is separated from the partition wall 29 by a thermal mat.

Figure 4:
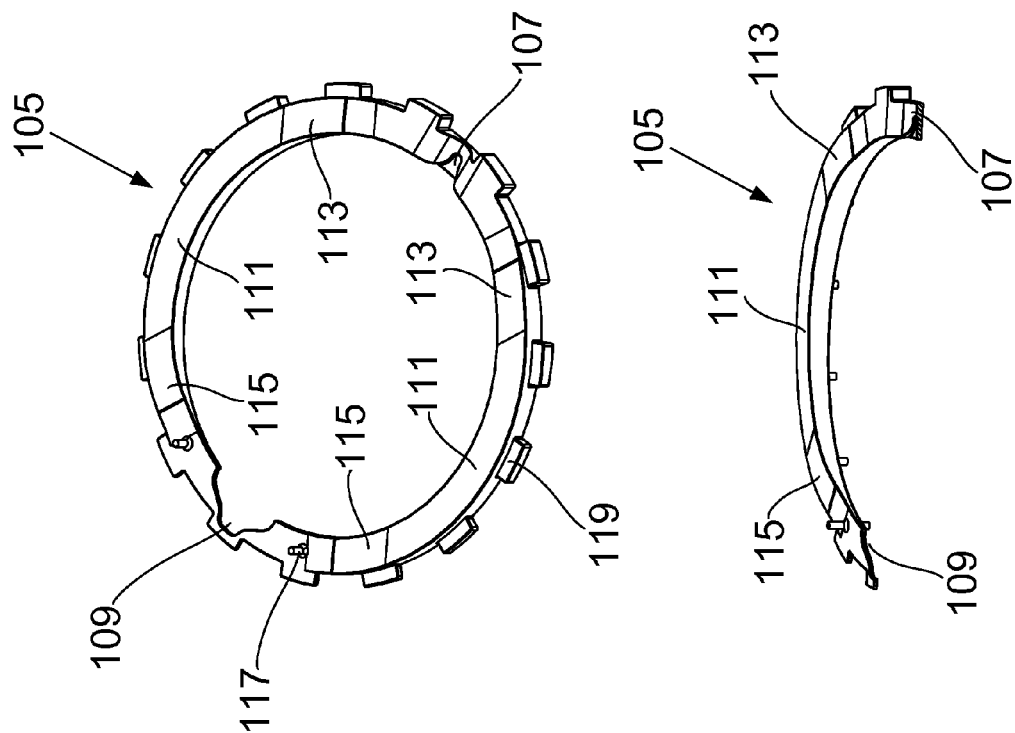
FIG. 4 shows a splitter ring for use in the ISG of FIG. 1.
Figure 4:
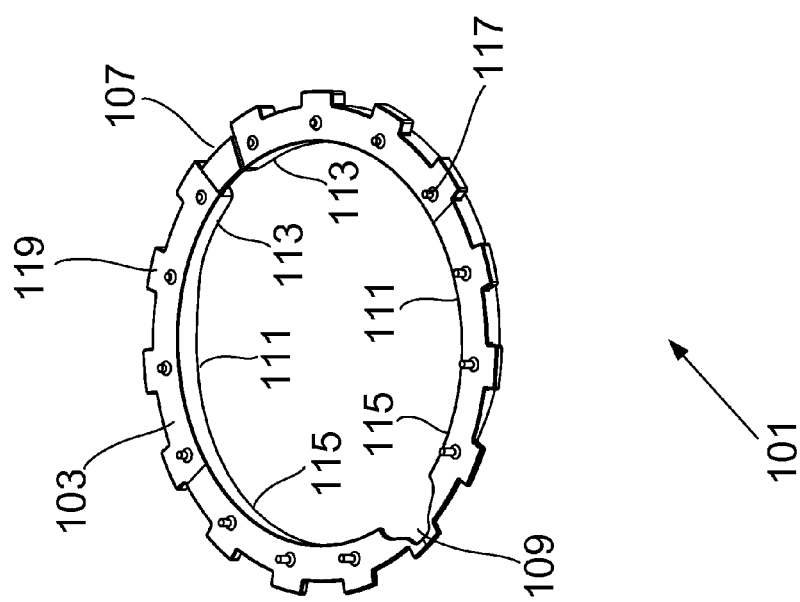
Figure 5A:
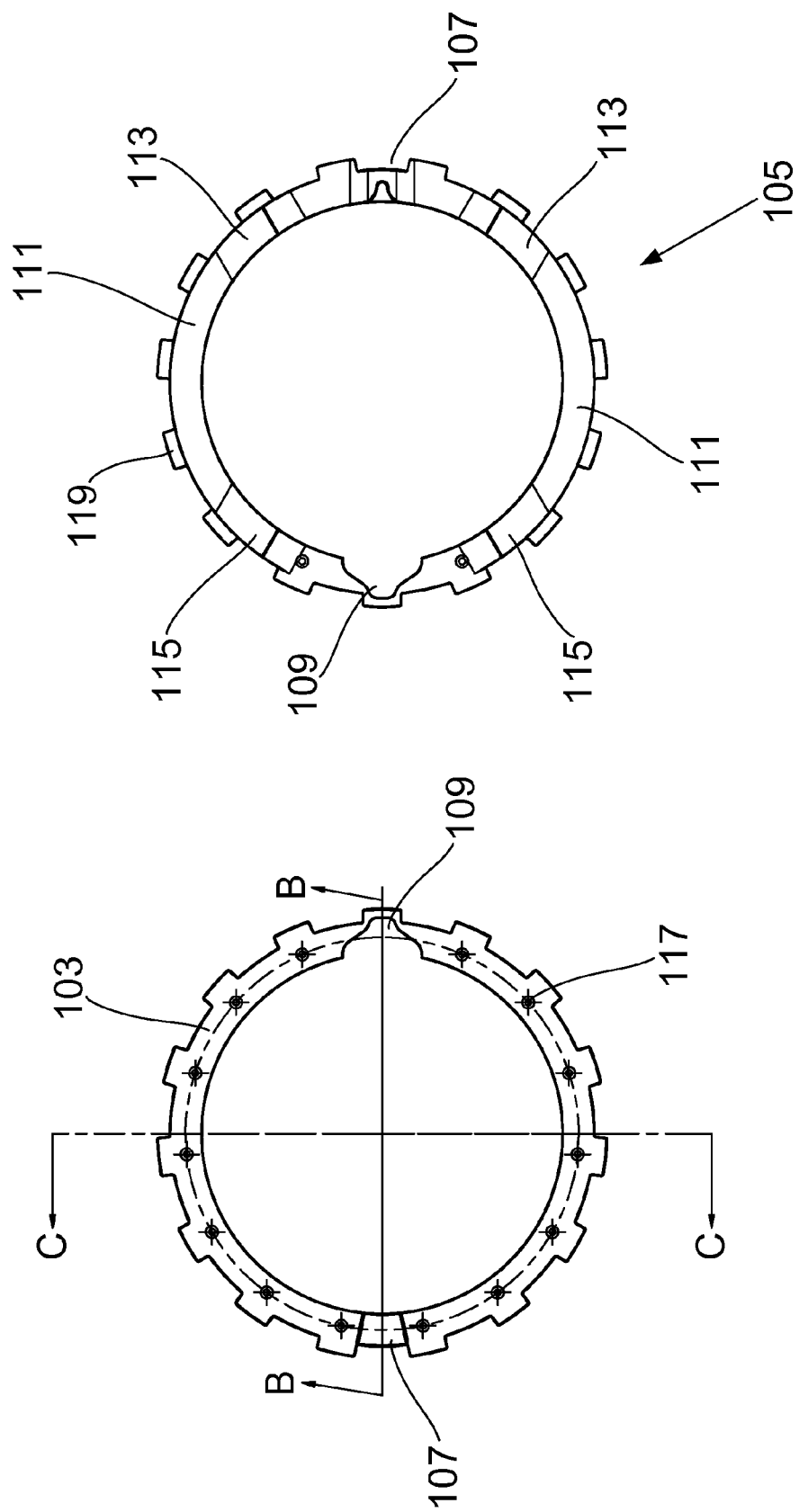
FIG. 5a shows upper and lower views of the splitter ring of FIG. 4.
Figure 5B:
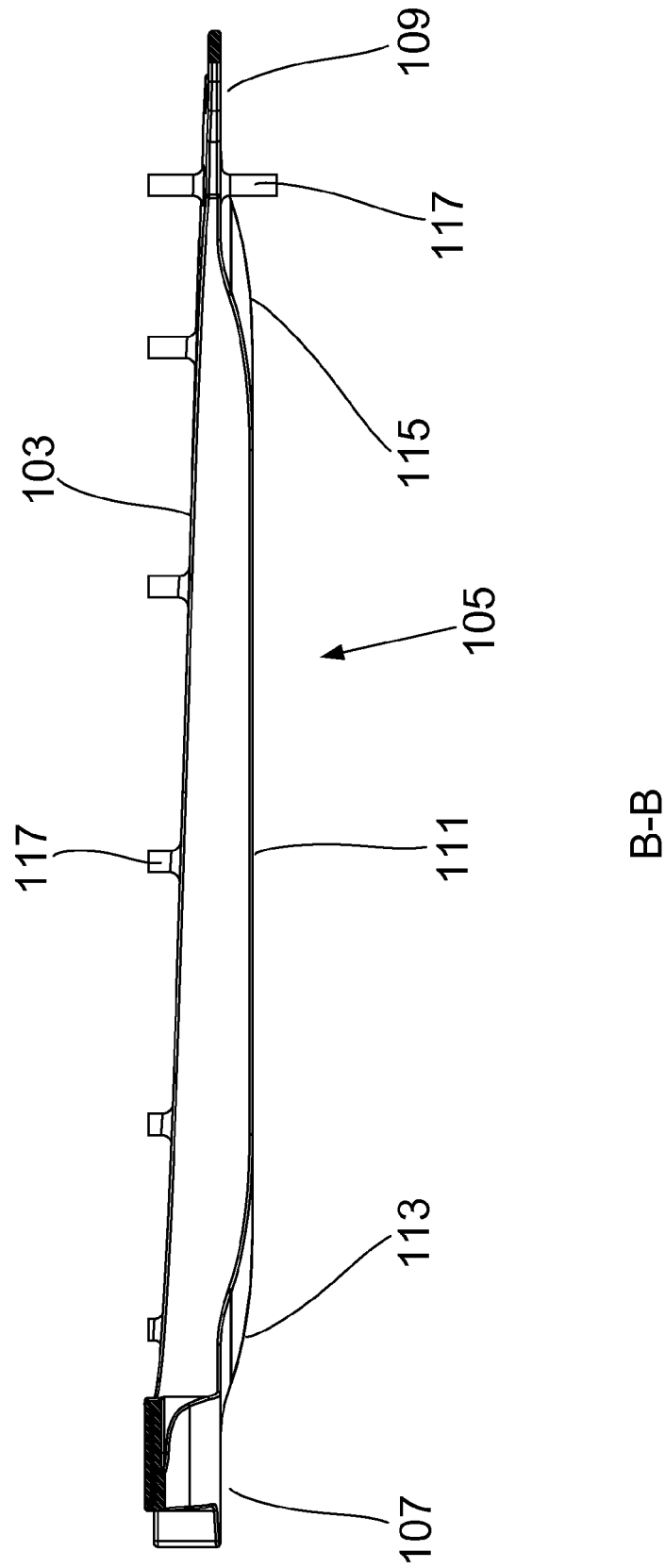
FIGS. 5b and 5c show sectional views of the splitter ring.
Figure 5C:
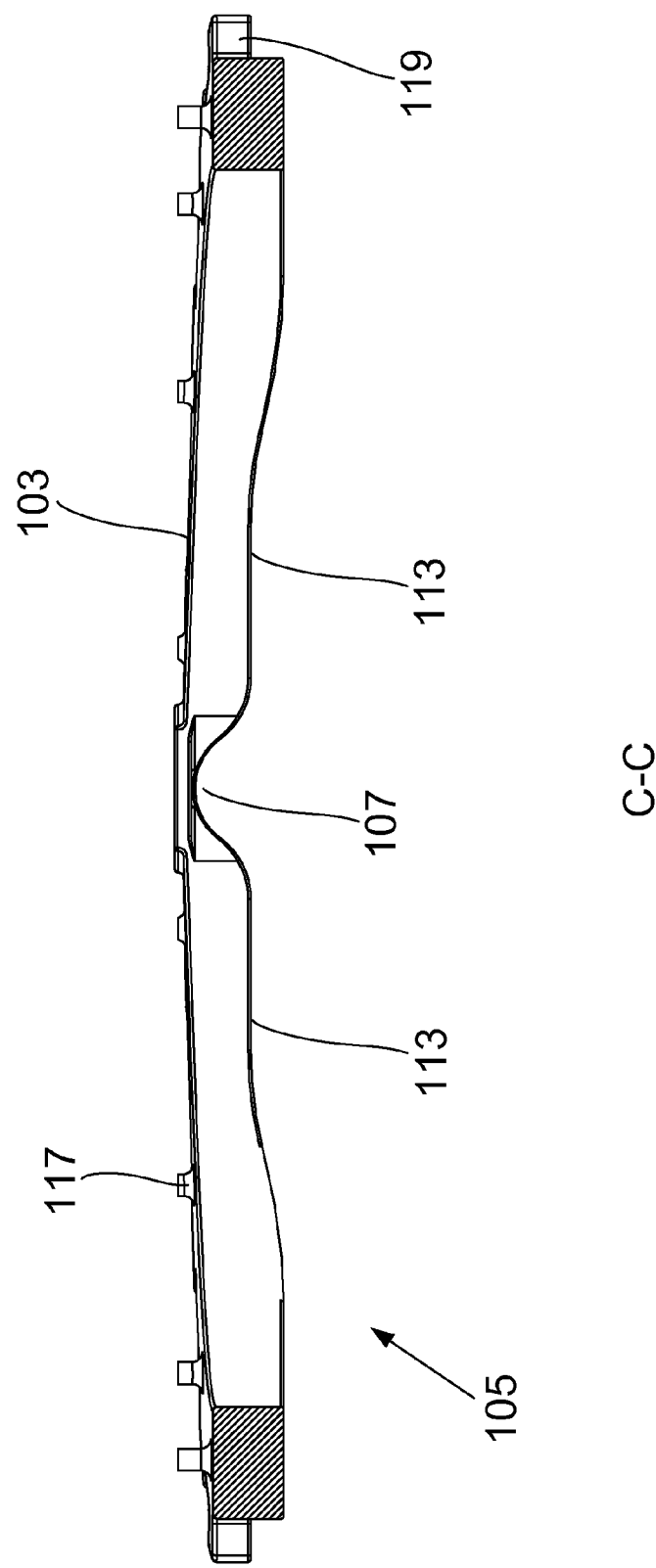

FIG. 4 shows a splitter ring 101, constructed from an injection-molded plastics and for use in the ISG 1. FIG. 5a shows upper and lower views of the splitter ring 101. FIG. 5b shows a sectional view taken along line B-B of FIG. 5a. FIG. 5c shows a sectional view taken along line C-C of FIG. 5a.

The splitter ring 101 comprises a generally flat upper face 103 and a partially contoured lower face 105. An inlet 107 and an outlet 109, suitable for conveying a liquid, are positioned at opposite sides of the splitter ring 101 (i.e. 180 degrees around from each other).

The lower most portion of the lower face 105 forms a flat, horizontal base 111 for the splitter ring 101. Contoured portions 113, 115 extend toward the inlet 107 and the outlet 109 respectively from the horizontal base 111.

The upper face 103 is inclined with respect to the horizontal base 111, such that the upper face 103 slants downwards from the thicker section of the splitter ring 101 at the inlet 107 to the thinner section at the outlet 109. Thus, as shown in FIG. 5b, the profile of the splitter ring 101 is generally tapered between the inlet 107 and the outlet 109.

Studs 117, positioned intermittently between the inlet 107 and the outlet 109, extend from the upper face 103. The studs 117 increase in length from the inlet 107 to the outlet 109, such that the top surfaces of the studs form a horizontal plane (parallel with the horizontal base 111). Studs 117 also extend from the lower face 105 in the region of the outlet 109.

Circumferentially spaced lugs 119 extend radially outwards from the splitter ring 101. The lugs extend vertically from the upper face 103 towards the lower face 105 such that the lower surfaces of the lugs 119 form a horizontal plane.

Figure 6:
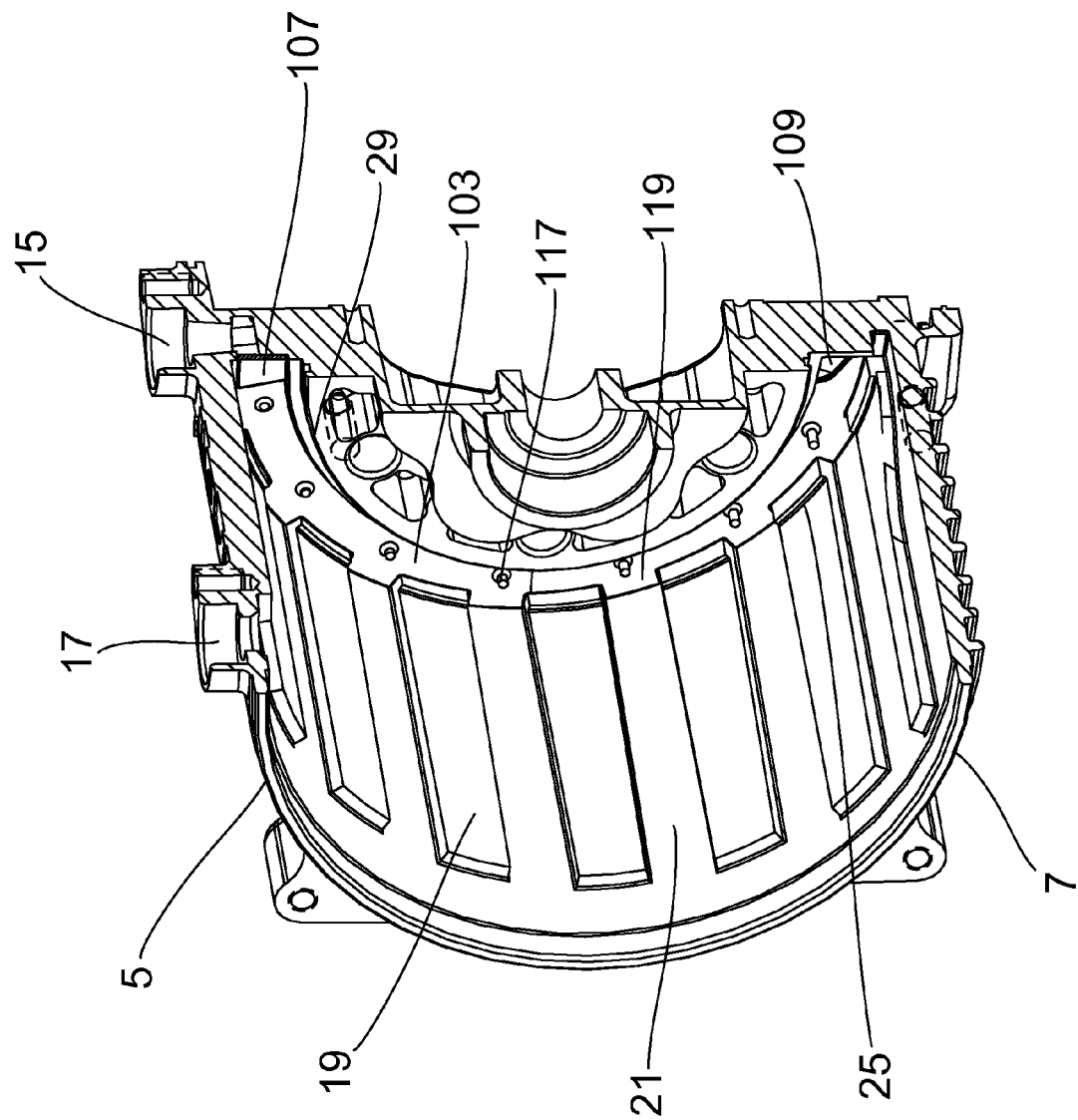
FIG. 6 shows a cutaway view of half of the housing of FIG. 3, including the splitter ring of FIG. 4.

FIG. 6 shows a cutaway view of half of the housing 5 of FIG. 3, including the splitter ring 101. The splitter ring 101 is installed forwards of the partition wall 29 and adjacent to the ridge 23. The lower face 105 of the splitter ring 101 faces the partition wall 29. The studs 117 extending from the lower face 105 contact the partition wall 29 and serve to prevent the thin end of the splitter ring 101 from flexing. The lugs 119 of the splitter ring 101 fit into and are supported by the recessed ledges 27, such as to terminate the axial channels 21. The inlet 107 of the splitter ring 101 is aligned with the inlet tube 15 of the housing 5.

Figure 2:
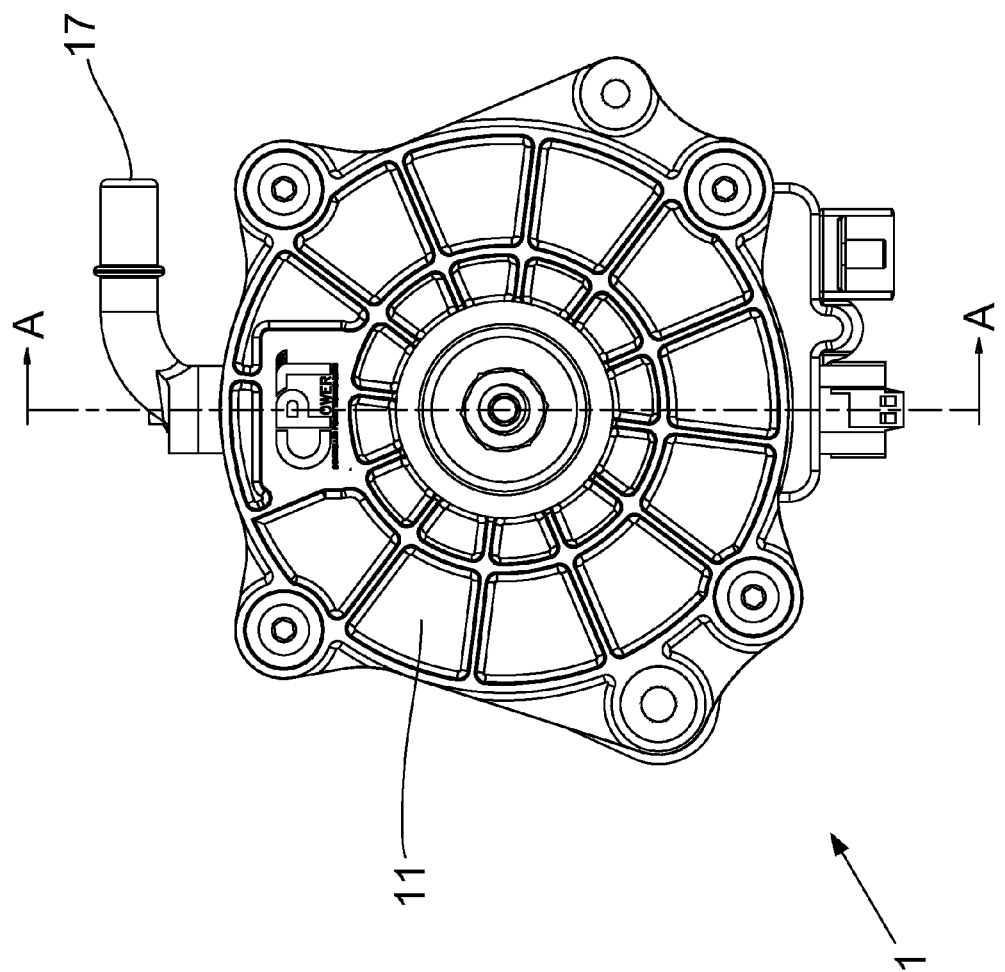
FIG. 2 shows a front elevation of the ISG of FIG. 1.
Figure 7:
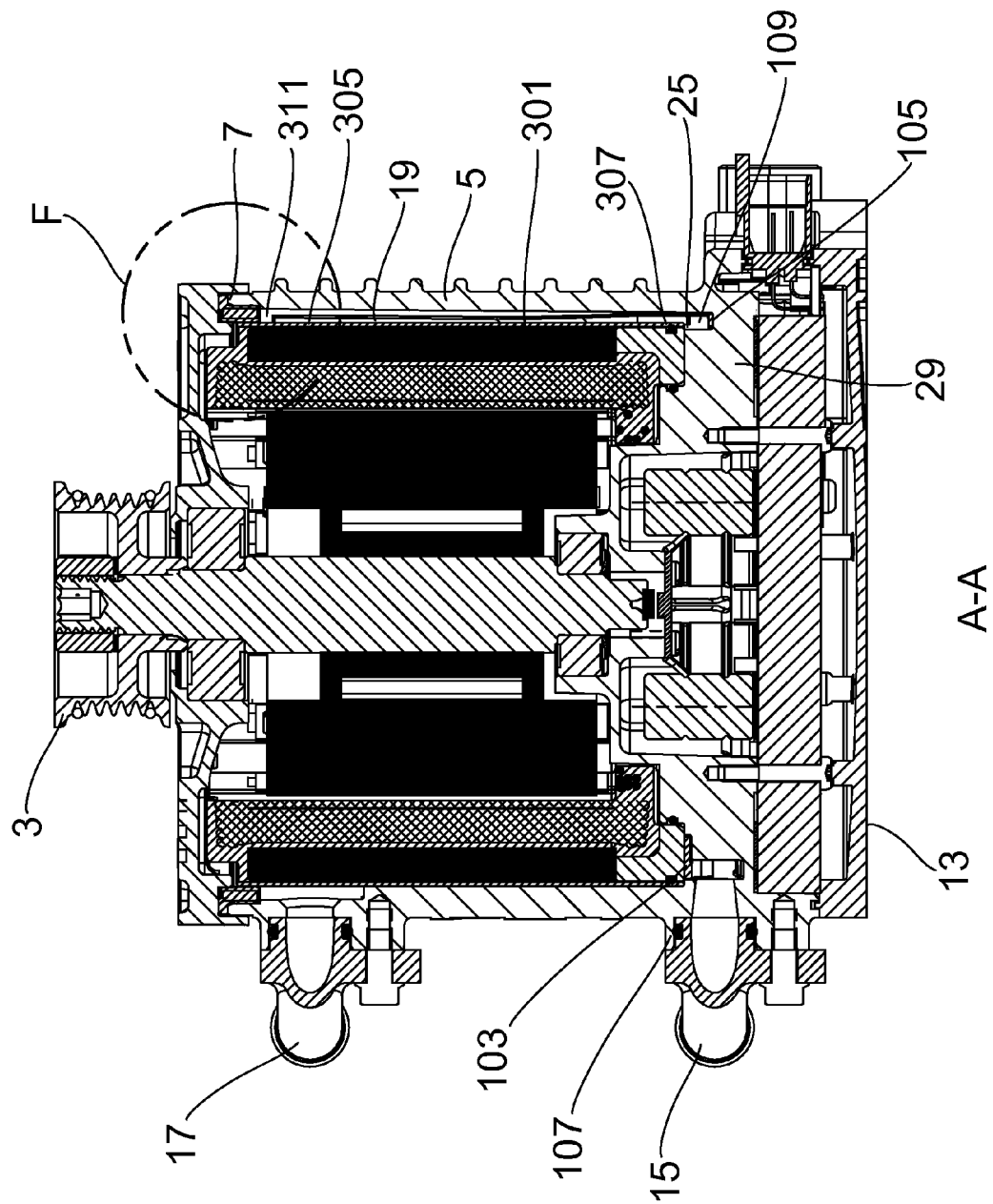
FIG. 7 shows a sectional view of the ISG of FIG. 1.

FIG. 7 shows a sectional view of the ISG 1 taken along line A-A of FIG. 2. The stator assembly 301 is installed into the housing 5 subsequent to the fitment of the splitter ring 101. The stator assembly 301 is contained within a cylindrical steel sleeve 303 which has an outer wall with an upper end 305 and a lower end 307. The outside diameter of the sleeve 303 is greater than the inside diameter of the housing 5. During the process of assembly of the ISG 1, the housing 5 is heated such that it expands to accommodate the sleeve 303. The sleeve 303 is then inserted into the housing 5 so that its lower end 307 rests on and is supported by the steps 25 at the roots of the ribs 19. The lower end 307 of the sleeve 303 also contacts the ends of the studs 117 of the upper face 103 of the splitter ring 101, constraining the splitter ring 101 to prevent axial movement. The outer wall of the sleeve 303 contacts the faces of the ribs 19 around the circumference of the interior of the housing 5. The upper end 305 of the sleeve 303 extends towards the front face 7 of the housing 5, beyond the forward most portions of the ribs 19, thereby joining the axial channels 21 together to form a circumferential conduit 311 between the housing 5 and the outer wall of the sleeve 303, forward of the ribs 19.

Thus, the axial channels 21 between the ribs 19 are closed off along the faces of the ribs 19 by the outer wall of the sleeve 303, but remain open both at the front face 7 of the housing 5 and at the roots of the axial channels 21 where they intersect with the splitter ring 101.

Subsequently, during the installation process the housing 5 is allowed to cool and consequently contracts, thereby forming an interference fit between the faces of the ribs 19 and the outer wall of the sleeve 303. This interference fit ensures that the housing 5 and sleeve 303 are not separated from each other when the ISG 1 experiences high temperatures in normal service.

With the splitter ring 101 and the stator assembly sleeve 303 installed in the housing 5, there are defined two chambers, each bounded at the inner edge of the splitter ring 101 by the inwardly projecting portion at the rear of the housing 5. A lower chamber is defined between the partition wall 29 and the lower face 105 of the splitter ring 101. Due to the contoured portions 113, 115 extending from the horizontal base 111 of the lower face 105, the cross-sectional area of the lower chamber varies along the splitter ring 101 from the inlet 107 to the outlet 109.

An upper chamber is defined between the horizontal lower end 307 of the stator assembly sleeve 303 and the slanted upper face 103 of the splitter ring 101. Due to the slant of the upper face 103, the cross-sectional area of the upper chamber changes at a constant rate between the inlet 107 and the outlet 109 of the splitter ring 101.

The front cover 11 is installed on the housing 5, closing off the circumferential conduit 311 at the front face 7 to produce a tapered section in the circumferential conduit 311, the tapered section being defined by the forward most portions of the ribs 19 which extend towards the front face 7 as described above.

With the ISG 1 so assembled: the inlet tube 15 of the housing 5 is linked to the lower chamber at the inlet 107 of the splitter ring 101; the lower chamber is linked to the upper chamber at the outlet 109 of the splitter ring 101; the upper chamber is linked to the axial channels 21 at the regions of the lugs 119 which are received in the recessed ledges 27; the circumferential conduit 311 is linked to the axial channels 21 at the upper end 305 of the sleeve 303; and the outlet tube 17 of the housing 5 is linked to the circumferential conduit 311.

Thus, there is formed a passageway for a liquid to flow through the housing 5 of the ISG 1 for cooling the electrical and electronic components and the stator assembly.

Figure 8:
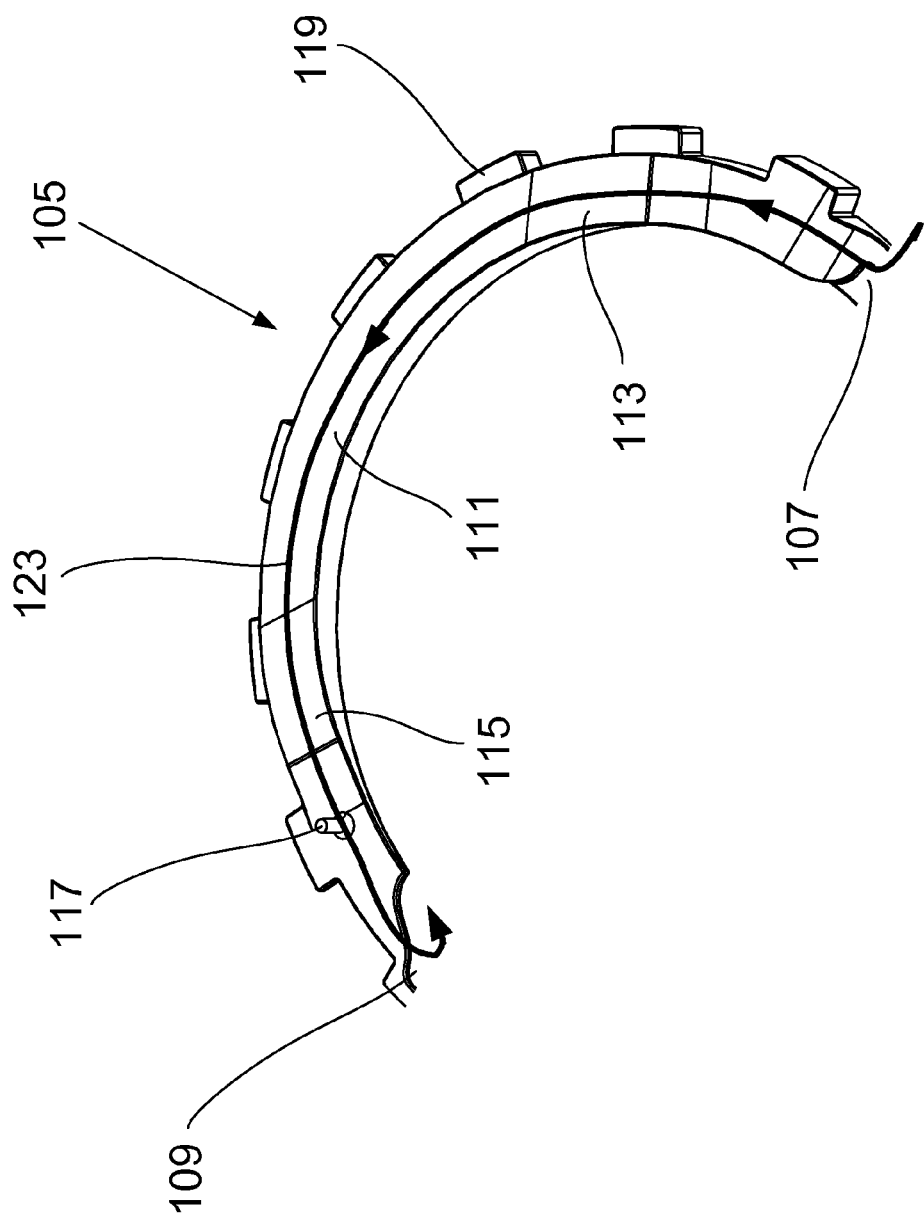
FIG. 8 shows a flow path of a liquid coolant over the lower face of the splitter ring of FIG. 4.

In use, the engine's water pump forces liquid coolant under pressure through the inlet tube 15 and into the lower chamber via the inlet 107 of the splitter ring 101. At the inlet 107 the coolant divides into two flow paths, each path tracing a semi-circle around the partition wall 29. One of these coolant flow paths 123 is illustrated in FIG. 8, which shows one half of the lower face 105 of the splitter ring 101 of FIG. 4. The two flow paths rejoin each other in the region of the outlet 109 of the splitter ring 101.

In the coolant flowing along each path 123 there exists a velocity boundary layer extending from the surface of the partition wall 29 into the flowing coolant. Another velocity boundary layer extends into the coolant from the lower face 105 of the splitter ring 101.

The coolant is an incompressible liquid which behaves according to the principle of continuity, so under steady flow conditions the velocity of flow is inversely proportional to the cross-sectional area at the liquid face (i.e. the area of a plane taken across the lower chamber normal to the direction of flow of the coolant). Thus, the velocity of the coolant increases as it flows from the inlet 107 and along that narrowing, tapered section of the lower chamber which is defined by the contoured portion 113 of the lower face 105 of the splitter ring 101 (which is above the partition wall 29). The coolant then flows at a constant velocity through that constant cross-section of the lower chamber which is defined by the horizontal base 111 of the lower face 105. The velocity of the coolant then decreases as it flows through that widening, tapered section of the lower chamber which is defined by the contoured portion 115 of the lower face 105 of the splitter ring 101. The coolant then reaches the outlet 109 of the splitter ring 101. The velocity of the coolant through the lower chamber is approximately 0.2 to 0.55 meters per second at a volumetric flow rate of approximately 2 liters per minute. This is optimal in terms of heat extraction from the electrical and electronic components. It also reduces the possibility of coolant contaminants becoming embedded in this critical cooling area.

The hot electrical and electronic components in the pod 13 adjacent to the partition wall 29 transfer heat to the partition wall 29 which results in a temperature difference between the partition wall 29 and the coolant flowing over it. Consequently there exists a thermal boundary layer extending from the surface of the partition wall 29 into the flowing coolant, and there is a transfer of thermal energy from the partition wall 29 to the coolant. The rate of heat transfer is proportional to the difference in temperature between the partition wall 29 and the coolant. The dominant heat transfer mechanism is convection. More particularly, it is a process of forced convection because the coolant is being pumped through the lower chamber by the engine's water pump.

As described above, the variation in the cross-sectional area through the lower chamber causes the velocity of the coolant to vary as it flows from the inlet 107 to the outlet 109 of the splitter ring 101. Accordingly, the amount of thermal energy extracted by the coolant per unit time varies between the inlet 107 and outlet 109. That is, the rate of heat transfer from the partition wall 29 to the coolant is defined by the shape of the lower chamber and it is kept substantially constant between the inlet 107 and the outlet 109 of the splitter ring 101. Consequently, the partition wall 29 is maintained at a substantially uniform temperature, avoiding any significant temperature gradient in the electrical and electronic components. This is important because such a temperature gradient could lead to uneven and possibly inadequate cooling of the electrical and electronic components, thereby limiting the performance of the ISG 1 or even causing damage to it.

The heat emitted by the electrical and electronic components in the pod 13 at the rear of the housing 5 reaches about 400 W. The heat emitted by the stator assembly in the housing 5 reaches about 1200 W.

The amount of heat convected away from the partition wall 29 to the coolant can be found, for example, by the application of Newton's law of cooling. This requires a knowledge of the convective heat transfer coefficient, which is a function of several factors including liquid density, velocity, viscosity, specific heat and thermal conductivity. The convective heat transfer coefficient may be obtained by first calculating the Nusselt number (the ratio of the heat entering the coolant from the partition wall 29 to the heat conducted away by the coolant) and the Prandtl number (the ratio of the velocity boundary layer thickness to the thermal boundary layer thickness). Alternatively, convective heat transfer coefficients for common fluids and various flow geometries have been established by experimentation and are well known.

At low velocities the flow of the coolant tends to be laminar. At higher velocities, with correspondingly higher Reynolds numbers, the flow can be turbulent. Turbulence influences the thermal boundary layer as well as the velocity boundary layer, because turbulence affects enthalpy transfer just as it does momentum transfer. The stagnant liquid film layer at the hot surface of the partition wall 29 is thinner in a turbulent flow compared to a laminar flow. Consequently, the convective heat transfer coefficient, and therefore the rate of heat transfer, is greater in the case of turbulent flow. Hence it is desirable to introduce turbulence into the coolant to increase the rate of heat transfer from the partition wall 29 to the coolant. This improves cooling performance such that the electrical and electronic components may be maintained at the desired temperature while operating at higher power levels. Alternatively, depending on the operator's requirements, they may be operated at lower temperatures at the same power level, potentially prolonging their useful service life.

The introduction of turbulence is achieved by the inclusion of irregularities in the surface of the partition wall 29, as can be seen in FIG. 3. These irregularities take the form of a series of alternating peaks and troughs, which present a wave-like pattern when the partition wall 29 is viewed in profile. These undulating peaks and troughs perturb the flow so as to alter the slope of the temperature profile of the coolant near the surface of the partition wall 29. They also have the effect of intermittently enlarging and reducing the cross-sectional area of the liquid face, thereby causing local variation in flow velocity. However, it is the effect on velocity of the contoured portions 113, 115 extending from the horizontal base 111 of the lower face 105 that is dominant.

The inclusion of the irregularities in the surface of the partition wall 29 generally increases the thickness of the section of the partition wall 29, providing increased structural strength in this region of the die-cast housing 5. This is beneficial because it helps the wall to endure the conditions to which it is subjected. These conditions include high temperatures and a large number of hot/cold thermal cycles, in conjunction with vibration caused by the rotation of the rotor and movement of the vehicle to which the ISG 1 is attached. However, despite the advantage of greater strength, the thickness of the wall is carefully limited to ensure that its heat transfer characteristics are consistent with the cooling requirements of the electrical and electronic components in the pod 13.

In general, a consequence of turbulence in the flow of liquid in a device is that the overall pressure drop through the device tends to increase. In the case of the present invention such a pressure drop is undesirable because it would place a greater demand on the engine's water pump which might, in turn, increase the engine's fuel consumption. Therefore, although it is advantageous to introduce turbulence into the flow as described above, the amount of turbulence is consciously limited. Thoughtful design produces effective mixing of the coolant to aid heat transfer without producing an unacceptably large pressure drop through excessive turbulence, which might occur, for example, if the coolant were forced to change direction too suddenly. In particular, careful determination of the gradient of the undulating peaks and troughs at the surface of the partition wall 29 enables the flow control apparatus to cool the electrical and electronic equipment effectively while strictly limiting any potential fuel consumption penalty.

Figure 9:
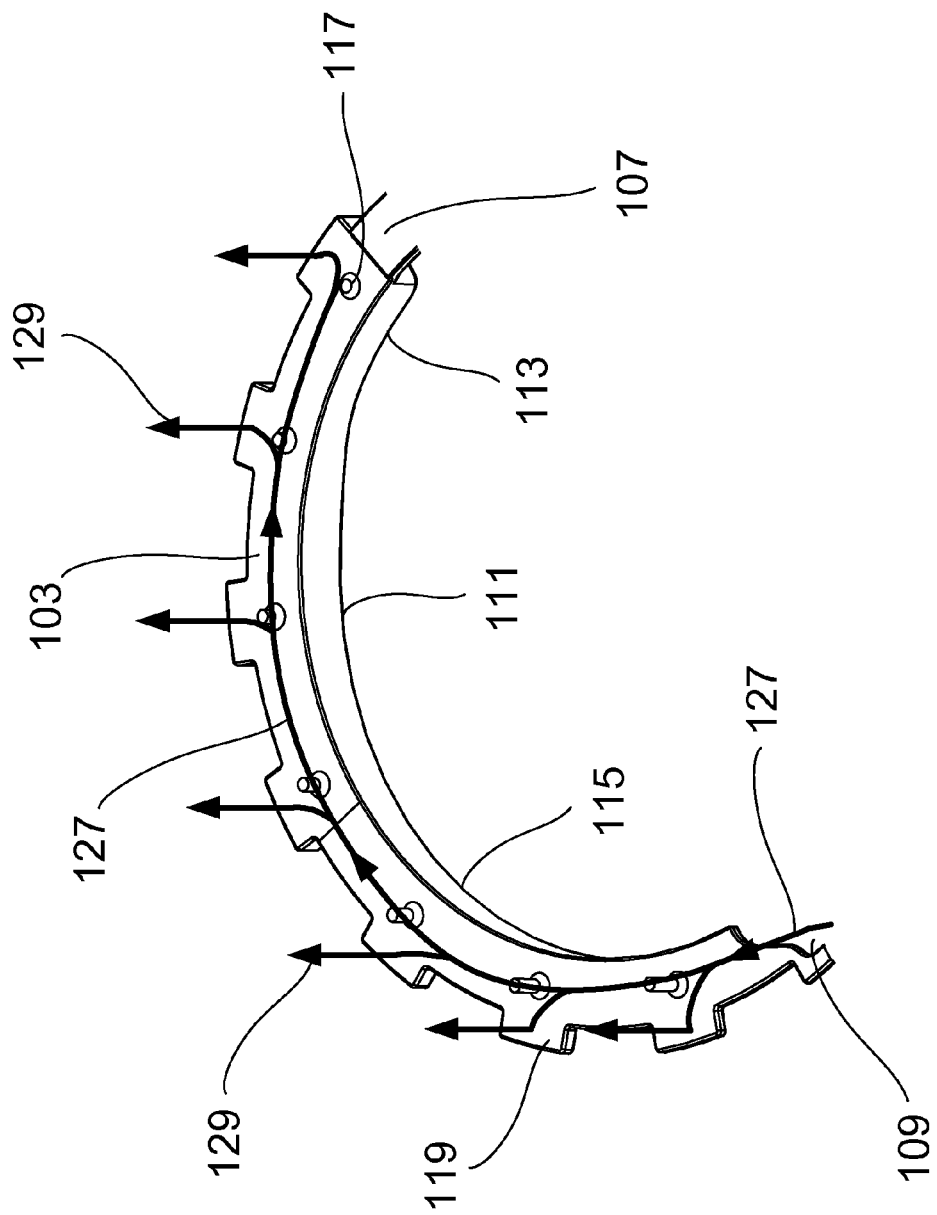
FIG. 9 shows a flow path of a liquid coolant over the upper face of the splitter ring of FIG. 4.

Having reached the outlet 109 of the splitter ring 101 the coolant then flows into the upper chamber and onto the upper face 103, where once again it divides into two flow paths. One of these flow paths 125 is illustrated in FIG. 9, which shows one half of the upper face 103 of the splitter ring 101 of FIG. 4.

As described above, the cross-section of the upper chamber varies at a constant rate due to the slant of the upper surface 103 of the splitter ring 101 with respect to the lower end 307 of the stator assembly sleeve 303. As the coolant flows along the upper face 103 away from the outlet 109, the cross-section of the upper chamber becomes narrower, hence the velocity of the coolant increases.

As the coolant flows along the upper face 103 a portion of the coolant is diverted onto another flow path 129 into the axial channels 21. This portion of the coolant is conveyed by the axial channels 21 to the circumferential conduit 311 and extracts thermal energy from the hot stator assembly sleeve 303. The coolant then flows through the widening section of the circumferential conduit 311 towards the outlet tube 17, from which it leaves the housing 5 to return to the cooling system of the engine of the vehicle.

Thus, the coolant is distributed at the desired velocity and quantity around the periphery of the housing 5 via the various axial channels 21, thereby cooling the stator assembly.

Figure 10A:
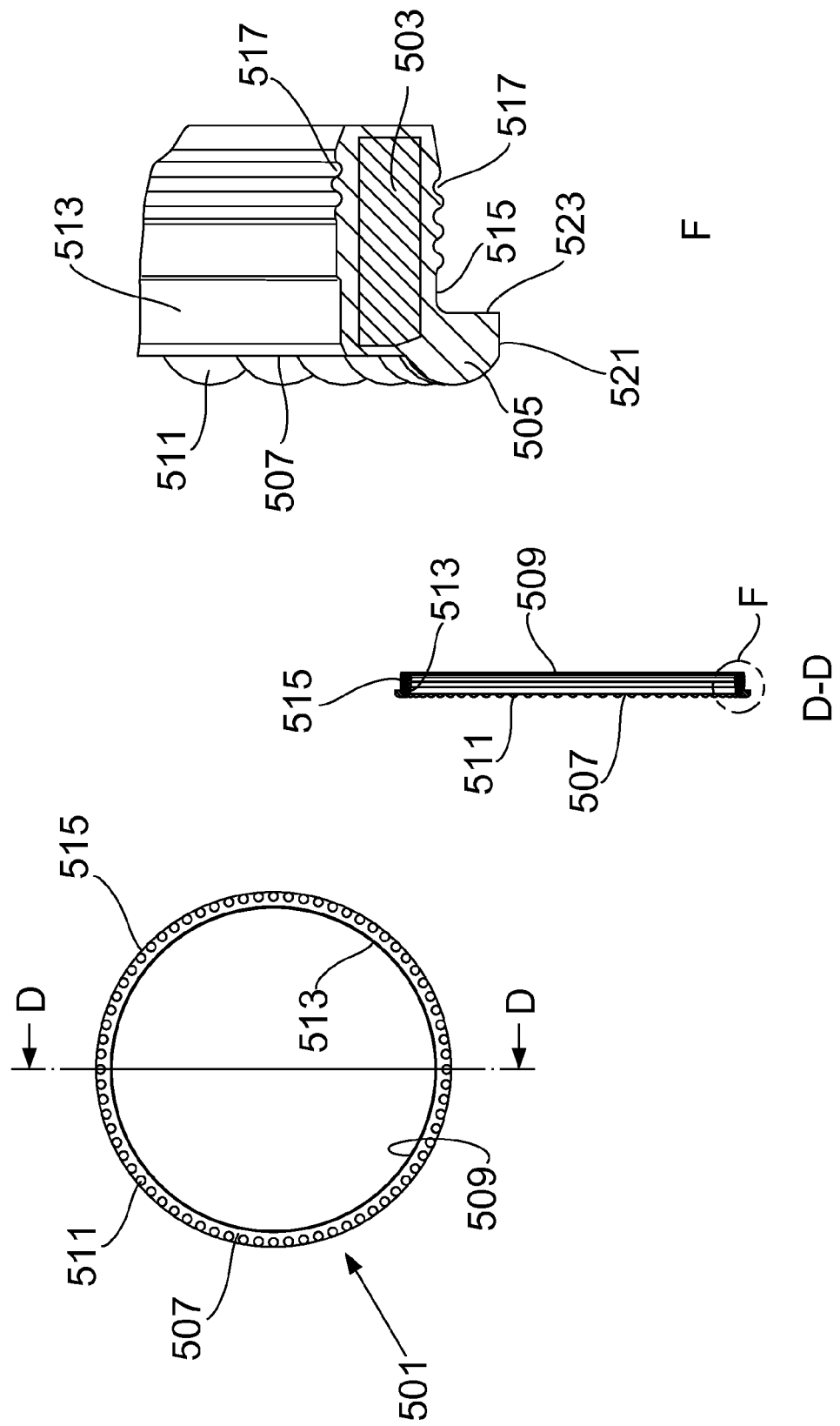
FIG. 10 shows an NVH (noise, vibration and harshness) ring for use in the ISG of FIG. 1.
Figure 10B:
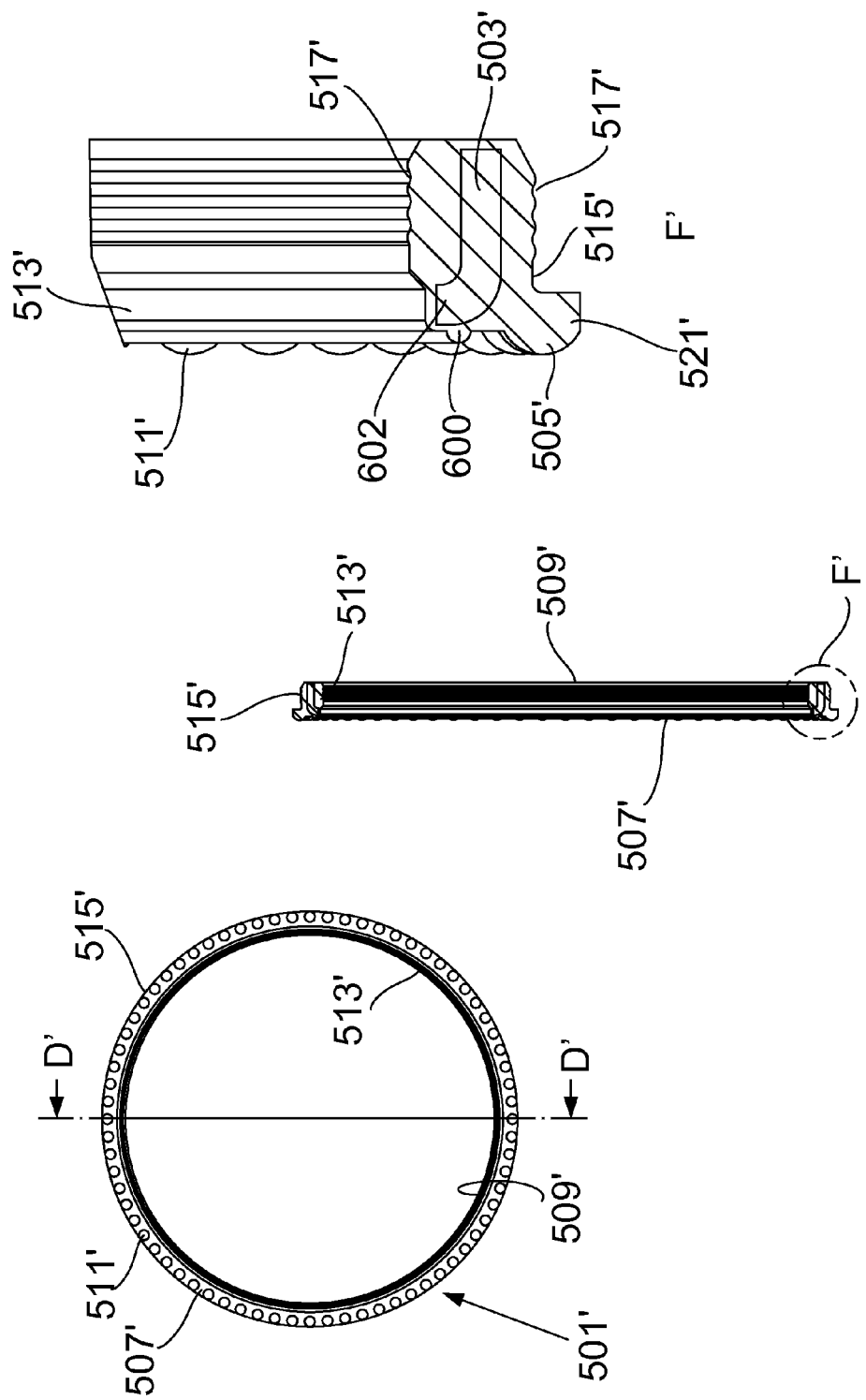
Figure 11:
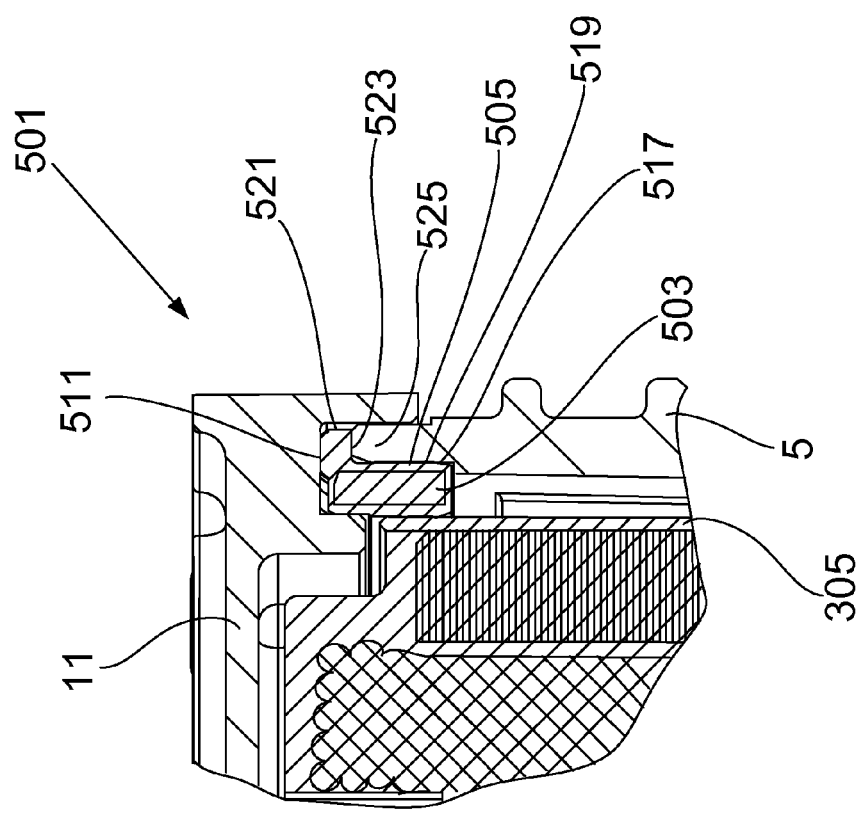
FIG. 11 shows the NVH ring of FIG. 10 installed in the ISG of FIG. 1.

FIG. 10 shows an NVH (noise, vibration and harshness) ring 501 for an ISG 1 as described above. FIG. 11 is a detailed view of the portion of the ISG 1 indicated in FIG. 7 and shows the NVH ring 501 installed in the ISG 1 between the housing 5 and the front cover 11. The NVH ring 501 separates the front cover 11 from the housing 5 in such a way that the two are not in direct contact with each other.

The NVH ring 501 has two functions. Firstly, it acts as a seal to prevent the escape of liquid coolant from the passages in the housing 5. Secondly, it absorbs and damps out vibration induced in the housing 5 by the stator/rotor assembly, thereby insulating the front cover 11 from the rotating components and reducing noise.

The NVH ring 501 comprises a stiff, steel core 503 enclosed in an elastomeric (rubber) casing 505. The steel core 503 is robust and provides form to the relatively flexible and deformable casing 505. The casing 505 has upper and lower faces 507, 509. The lower face 509 is flat and smooth. The upper face 507 includes a plurality of raised dimples 511 spaced apart from each other. The upper and lower faces 507, 509 are connected by inner and outer annular walls 513, 515.

The walls 513, 515 include circumferential gripping grooves 517 which correspond to radial projections 519 on the housing 5 and front cover 11. The grooves 517 engage the projections 519 such that the NVH ring 501 resists axial movement relative to the housing 5 and provides a leak tight seal.

A lip 521 extends radially outward from the upper face 507 to define a flange 523 around the periphery of the outer annular wall 515. The flange 523 abuts annular projections 525 on the housing 5, locating the NVH ring 501 and providing a contact surface for the front cover 11.

The front cover 11 is secured to the housing 5 by a plurality of bolts. The axial clamping load transmitted to the NVH ring 501 as the bolts are tightened causes the dimples 511 to undergo generally elastic deformation in the inward and outward radial directions. This flattening of the dimples 511 absorbs the clamping force such that the front cover 11 and the housing 5 are connected securely together without causing the annular walls 513, 515 of the NVH ring 501 to be crushed or otherwise significantly distorted. This serves to ensure the integrity of the seal, which prevents an escape of liquid from the cooling passages of the ISG 1.

It will be appreciated that the flow control apparatus described above may take various forms and these are not limited to those expressed in the drawings.

The irregularities in the surface of the partition wall 29 could be dimples, grooves or other appropriate means for perturbing the flow such that it becomes turbulent.

The splitter ring 101 may be constructed from a material other than molded plastic, for example aluminum or steel.

In a second embodiment of the present invention the splitter ring 101 is omitted. Instead, the variations in cross-sectional area of the coolant flow path described above are obtained by forming the structure of the upper and lower chambers in the casting of the housing 5 itself.

Figure 12:
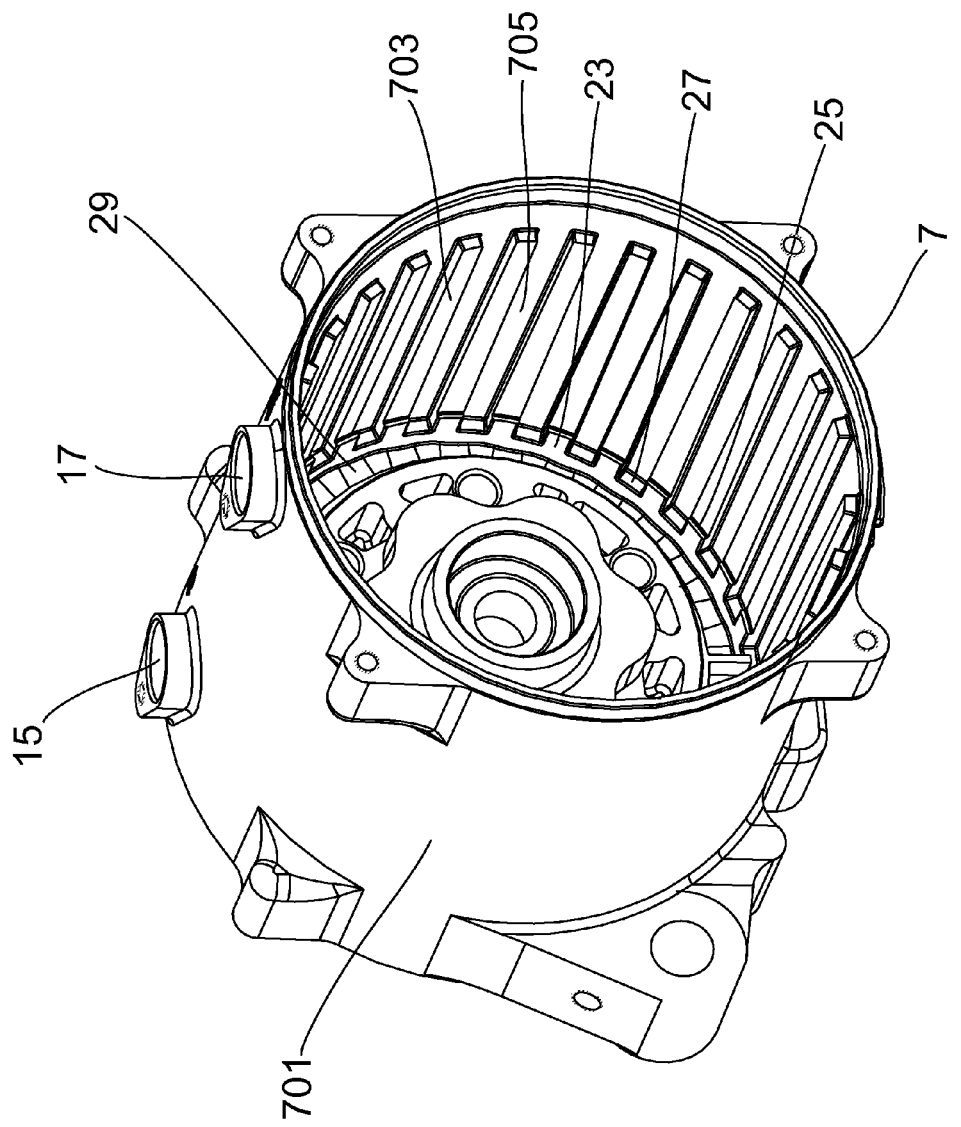
FIG. 12 shows a modified housing used in another embodiment of the present invention.

FIG. 12 shows a housing 701 used in a third embodiment of the present invention. The housing 701 is similar to the housing 5 described above with the exception that the number of ribs 703 is increased from 15 to 29, with a corresponding increase in the number of axial channels 705 between the ribs 703.

Figure 13:
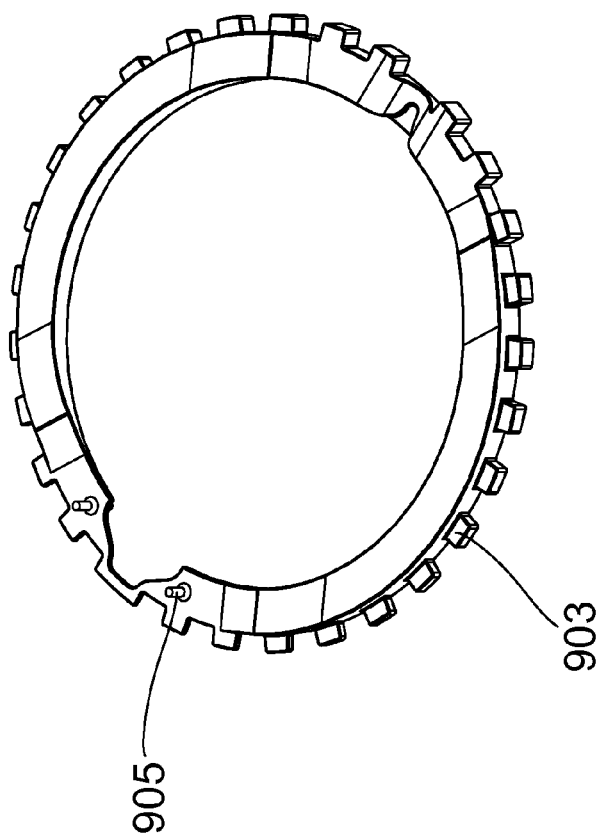
FIG. 13 shows a modified splitter ring for use with the housing of FIG. 12.
Figure 13:
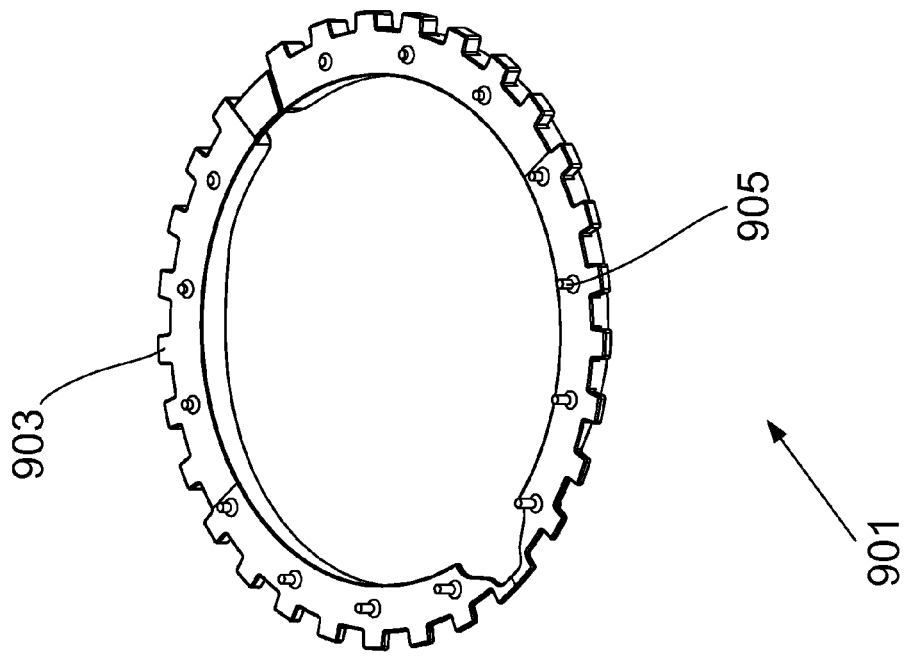

FIG. 13 shows a splitter ring 901 for use with the housing 701 of FIG. 12. The splitter ring 901 is similar to the splitter ring 101 described above with the exception that the number and position of the lugs 903 and studs 905 is altered to correspond to the housing 701.

In this embodiment the greater number of ribs 703 in the housing 701 means that the width of each rib 703 and each axial channel 705 is smaller. This offers three particular advantages. Firstly, there is a decrease in the level of stress in the housing 701 where the housing 701 is in contact with the stator assembly sleeve 303. Secondly, resonance in the axial channels 705 (caused by the stator/rotor) is reduced, lessening the noise level of the ISG 1 and extending the fatigue life of the housing 701. Thirdly, due to an increase of rib 703 surface area in contact with the coolant in the axial channels 705, there is improved heat transfer from the stator assembly sleeve 303 to the coolant. This results in a more uniform temperature field around the circumference of the housing 701 and a lower peak temperature.

The invention claimed is:

1. A flow control apparatus for an electrical machine and comprising:
    a first wall and a second wall, the second wall being inclined with respect to the first wall so as to define a tapered first chamber between the first and second walls, the first chamber including an entrance aperture and an exit aperture wherein;

in use the taper causes the velocity of a liquid in the first chamber to be varied as the liquid is conveyed between the entrance aperture and the exit aperture, such that a transfer of thermal energy from a heat source to the liquid via the first wall is substantially uniform between the entrance aperture and the exit aperture.

2. The flow control apparatus as claimed in claim 1 wherein:

the second wall comprises a guide member, the guide member having a first face and a second face, the first face being inclined with respect to the second face so as to form a tapered profile between the first and second faces, and wherein;

the tapered first chamber is defined by the first wall and the first face of the guide member.

3. The flow control apparatus as claimed in claim 2 and further comprising:

a third wall comprising a flow path, the flow path being arranged to receive a liquid; and a second chamber, defined by the third wall and the second face of the guide member, the exit aperture of the first chamber being coupled to the second chamber wherein;

in use the liquid is conveyed from the first chamber to the second chamber via the exit aperture and at least a portion of the liquid in the second chamber is diverted onto the flow path.

4. The flow control apparatus as claimed in claim 1 wherein the first wall comprises an undulated surface suitable for inducing turbulence in the liquid.

5. The flow control apparatus as claimed in claim 2 wherein the first face of the guide member comprises an undulated surface suitable for inducing turbulence in the liquid.

6. The flow control apparatus as claimed in claims 3 wherein the first face of the guide member comprises an undulated surface suitable for inducing turbulence in the liquid.

* * * * *